United States Patent
Ohkubo

[11] Patent Number: 6,140,011
[45] Date of Patent: *Oct. 31, 2000

[54] OPTICAL INFORMATION RECORDING MEDIUM

[75] Inventor: Shuichi Ohkubo, Tokyo, Japan

[73] Assignee: NEC Corporation, Tokyo, Japan

[*] Notice: This patent is subject to a terminal disclaimer.

[21] Appl. No.: 09/234,500

[22] Filed: Jan. 21, 1999

Related U.S. Application Data

[60] Continuation of application No. 08/959,032, Oct. 28, 1997, Pat. No. 5,900,347, which is a division of application No. 08/762,307, Dec. 9, 1996, Pat. No. 5,719,006, which is a continuation of application No. 08/545,345, Oct. 19, 1995, abandoned.

[30] Foreign Application Priority Data

Oct. 19, 1994 [JP] Japan .................................. 6-253326

[51] Int. Cl.$^7$ ....................................................... G11B 7/24
[52] U.S. Cl. ................. 430/270.13; 430/945; 369/275.2; 369/275.5; 428/64.6; 427/162; 427/164
[58] Field of Search ............................... 430/270.13, 945; 428/64.6; 427/162, 164; 369/275.2, 275.5

[56] References Cited

U.S. PATENT DOCUMENTS

| | | | |
|---|---|---|---|
| 4,954,379 | 9/1990 | Nishida et al. | 430/945 |
| 5,107,482 | 4/1992 | Goto et al. | 430/945 |
| 5,230,973 | 7/1993 | Yoshioka et al. | 430/270.13 |
| 5,276,670 | 1/1994 | Nogumi et al. | 369/116 |
| 5,342,714 | 8/1994 | Ide | 430/19 |
| 5,424,106 | 6/1995 | Yamada et al. | 430/945 |
| 5,506,022 | 4/1996 | Ide | 430/945 |
| 5,719,006 | 2/1998 | Ohkubo | 430/270.13 |
| 5,900,347 | 5/1999 | Ohkubo | 427/162 |

FOREIGN PATENT DOCUMENTS

| | | |
|---|---|---|
| 0347801 | 12/1989 | European Pat. Off. . |
| 0630007 | 12/1994 | European Pat. Off. . |
| 0766240 | 4/1997 | European Pat. Off. . |
| 61-211852 | 9/1986 | Japan . |
| 62-298947 | 12/1987 | Japan . |
| 1149238 | 6/1989 | Japan . |
| 3102658 | 4/1991 | Japan . |
| 3104036 | 5/1991 | Japan . |
| 3-160635 | 7/1991 | Japan .................................. 369/275.5 |
| 4102243 | 4/1992 | Japan . |
| 64903 | 1/1994 | Japan . |

*Primary Examiner*—Martin Angebranndt
*Attorney, Agent, or Firm*—Sughrue, Mion, Zinn, Macpeak & Seas, PLLC

[57] ABSTRACT

An optical information recording medium includes a transparent substrate, a first dielectric layer, a recording layer, a second dielectric layer, a reflecting layer, and a third dielectric layer. The substrate constitutes an optical disk for performing a mark edge recording operation. The first dielectric layer is formed on the substrate. The recording layer is formed on the first dielectric layer and is irradiated with a laser beam to undergo a reversible phase change between a crystalline state and an amorphous state, thereby recording and erasing information. The recorded information is reproduced by detecting a change in optical characteristics accompanying a phase change of the recording layer. The second dielectric layer is formed on the recording layer. The first and second dielectric layers protect the recording layer. The reflecting layer is formed on the second dielectric layer and has a predetermined transmittance. The third dielectric layer is formed on the reflecting layer and has a thickness set to control a relationship between an absorbance Ac of the recording layer in the crystalline state and an absorbance Aa in the amorphous state according to Ac>Aa. The dielectric layer is made of a dielectric material having a refractive index n larger than 1.5.

4 Claims, 4 Drawing Sheets

UV/Si(60)ZnS-SiO₂(18)/GeSbTe(15)/ZnS-SiO₂(D₁)/PC 6,140,011

OPTICAL INFORMATION RECORDING MEDIUM

This is a continuation of application Ser. No. 08/959,032 filed on Oct. 28, 1997 (which issued as U.S. Pat. No. 5,900,347 on May 4, 1999), which is a divisional of application Ser. No. 08/762,307 filed Dec. 9, 1996 (which issued as U.S. Pat. No. 5,719,006 on Feb. 17, 1998), which is a continuation of application Ser. No. 08/545,345 filed Oct. 19, 1995 (abandoned).

BACKGROUND OF THE INVENTION

The present invention relates to an optical information recording medium on/from which information is recorded/erased by using a change in optical constant upon a phase change induced by different thermal hystereses and, more particularly, to a phase change optical disk.

As an optical information recording medium on/from which information is recorded/erased by irradiating a laser beam, a magneto-optical disk, a phase change optical disk, and the like are known. For example, in the phase change optical disk, as shown in FIG. 4, a first dielectric layer 2, a recording layer 3, a second dielectric layer 4, and a reflecting layer 5 are sequentially formed on a substrate 1 to constitute a four-layer structure. Information is recorded and erased by using a phase change between the amorphous and crystalline states of the recording layer which is induced by different thermal hystereses of heating and cooling performed by irradiation of a laser beam. More specifically, the recording layer is fused and rapidly cooled to be brought to the amorphous state, thereby recording information. In contrast to this, the recording layer is kept at a crystallization temperature or more for a predetermined period of time to be brought to the crystalline state, thereby erasing information. A signal is reproduced by using the difference in reflectance between the amorphous state and the crystalline state. The thicknesses of the first dielectric layer 2, the recording layer 3, the second dielectric layer 4, and the reflecting layer 5 are optimized in terms of sensitivity, C/N ratio, erasability, rewritable repetition count, and the like. For the first and second dielectric layers 2 and 4, $ZnS-SiO_2$, $SiN$, $SiO_2$, or the like is used. For the recording layer 3, SbTe, GeSbTe, AgInSbTe, or the like is used. For the reflecting layer 5, Al, Au, or the like is used.

As a method of increasing a recording density, a mark edge recording method is effective. In this method, pieces of information are given to two ends of each recorded mark. In the phase change optical disk from which a signal is reproduced by using the difference in reflectance between the amorphous state and the crystalline state, the absorbance (Ac) in the crystalline state is often different from the absorbance (Aa) in the amorphous state. In general, Aa is higher than Ac. In such a case, the width or length of a mark to be formed is influenced by the state of the recording layer before an overwrite operation, i.e., the crystalline or amorphous state. That is, the jitter greatly increases after the overwrite operation. For this reason, in order to reduce the jitter and realize the mark edge recording method in the phase change optical disk, the sensitivity in the amorphous state must be set to be equal to that in the crystalline state. The disk is preferably designed such that Ac is higher than Aa, considering that the heat conductivity in the crystalline state is higher than that in the amorphous state, and the amount of latent heat upon fusion is large. As effective means for providing such a medium, the absorbance control method disclosed in Japanese Patent Laid-Open No. 1-149238 and the absorbance control method disclosed in Japanese Patent Laid-Open No. 4-102243 are known. The former method uses a transparent thin metal film as a reflecting film. The latter method uses a high-refractive-index material such as Si as a reflecting film. In these methods, it is important to greatly change the transmittance between the amorphous state and the crystalline state.

In addition, the method disclosed in Japanese Patent Laid-Open No. 6-4903 is known as an absorbance control method using a metal reflecting film.

As an optical head light source for a currently available optical disk, a laser diode with a wavelength of 780 to 830 nm is used. Attempts have been made to decrease the wavelength of light from a laser diode, and a high-power red laser diode with a wavelength of about 690 nm is being put into practice. A change in optical constant due to a phase change of a recording layer used for a phase change optical disk, i.e., the difference in optical constant between the amorphous state and the crystalline state, decreases with a decrease in wavelength. For this reason, in a medium having a conventional structure designed to perform absorbance control by using transmitted light, if the absorbance Ac is set to be higher than the absorbance Aa in the amorphous state, the difference in reflectance between the two states decreases, resulting in a decrease in C/N ratio. This problem becomes serious especially under the condition of a high linear velocity, in which Ac/Aa must be maximized. With the direct application of the above conventional techniques (Japanese Patent Laid-Open Nos. 1-149238, 4-102243, and 6-4903), it is difficult to obtain good overwrite characteristics. For example, $Ge_2Sb_2Te_5$ exhibits the following optical constants (a refractive index n and an extinction coefficient k) at a wavelength of 830 nm: (n=4.6; k=1.06) in the amorphous state; and (n=5.89; k=3.47) in the crystalline state. At a wavelength of 690 nm, (n=4.36; k=1.72) in the amorphous state; and (n=4.46; k=4.0) in the crystalline state. That is, the change in the refractive index n is small. For this reason, as shown in FIG. 3, if the difference in reflectance between the crystalline and the amorphous state is set to be about 15% at a wavelength of 690 nm, Ac/Aa is about 1.1 at maximum. Therefore, under the condition of a high linear velocity, in which Ac/Aa needs to be large, an overwrite operation will increase the jitter. At a wavelength of 532 nm, which allows higher recording densities, although not practical at present, the changes in optical constants further decrease as follows: (n=3.53; k=1.98) in the amorphous state; and (n=2.39; k=3.86) in the crystalline state. Consequently, it is more difficult to perform absorbance control while ensuring a high C/N ratio.

SUMMARY OF THE INVENTION

It is an object of the present invention to provide a phase change type optical information recording medium which can obtain good overwrite characteristics in a mark edge recording operation using a short-wavelength light source at a high linear velocity.

In order to achieve the above object, according to the present invention, there is provided an optical information recording medium comprising a transparent substrate constituting an optical disk for performing a mark edge recording operation, a first dielectric layer formed on the transparent substrate, a recording layer which is formed on the first dielectric layer and is irradiated with a laser beam to undergo a reversible phase change between a crystalline state and an amorphous state, thereby recording and erasing information, the recorded information being reproduced by detecting a change in optical characteristics accompanying a phase change of the recording layer, a second dielectric layer formed on the recording layer, the first and second dielectric layers protecting the recording layer, a reflecting layer formed on the second dielectric layer and having a predetermined transmittance, and a third dielectric layer formed on the reflecting layer and having a thickness set to control a relationship between an absorbance Ac of the recording layer in the crystalline state and an absorbance Aa in the amorphous state according to Ac >Aa, the dielectric layer being made of a dielectric material having a refractive index n larger than 1.5.

DESCRIPTION OF THE PREFERRED EMBODIMENTS

Embodiments of the present invention will be described below with reference to the accompanying drawings.

Figure 2:
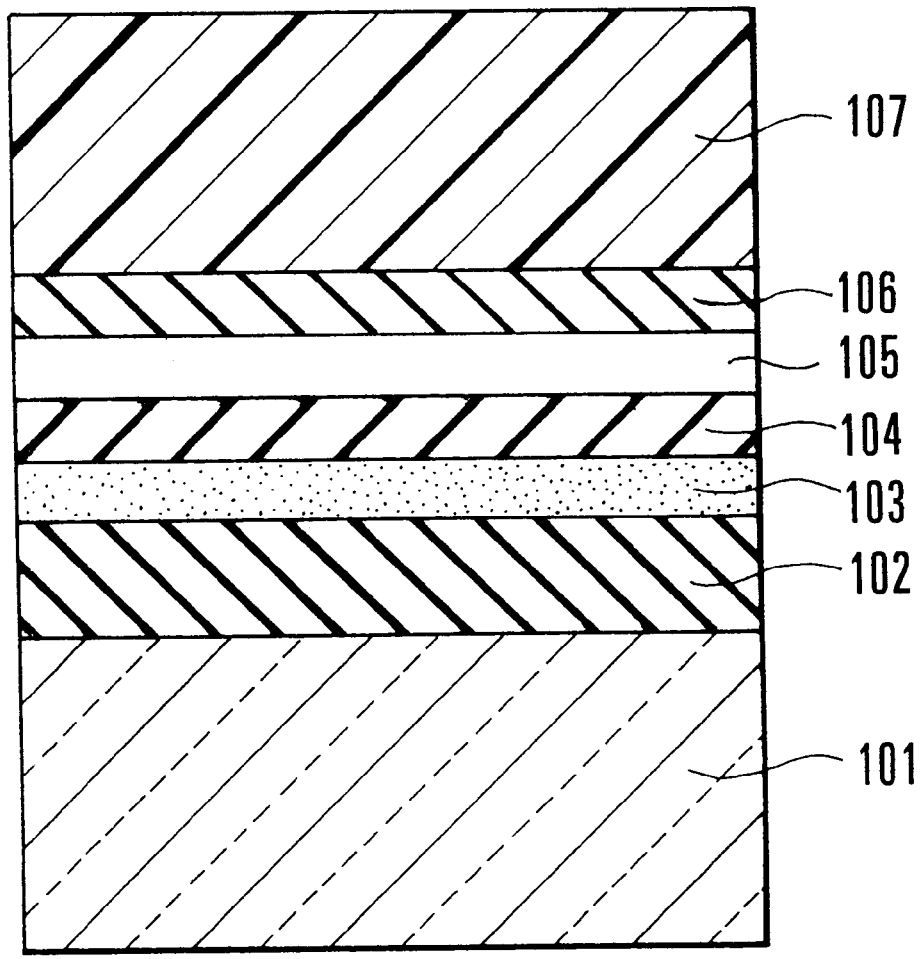
FIG. 2 is a sectional view showing the structure of the optical information recording medium according to the embodiment.
Figure 3:
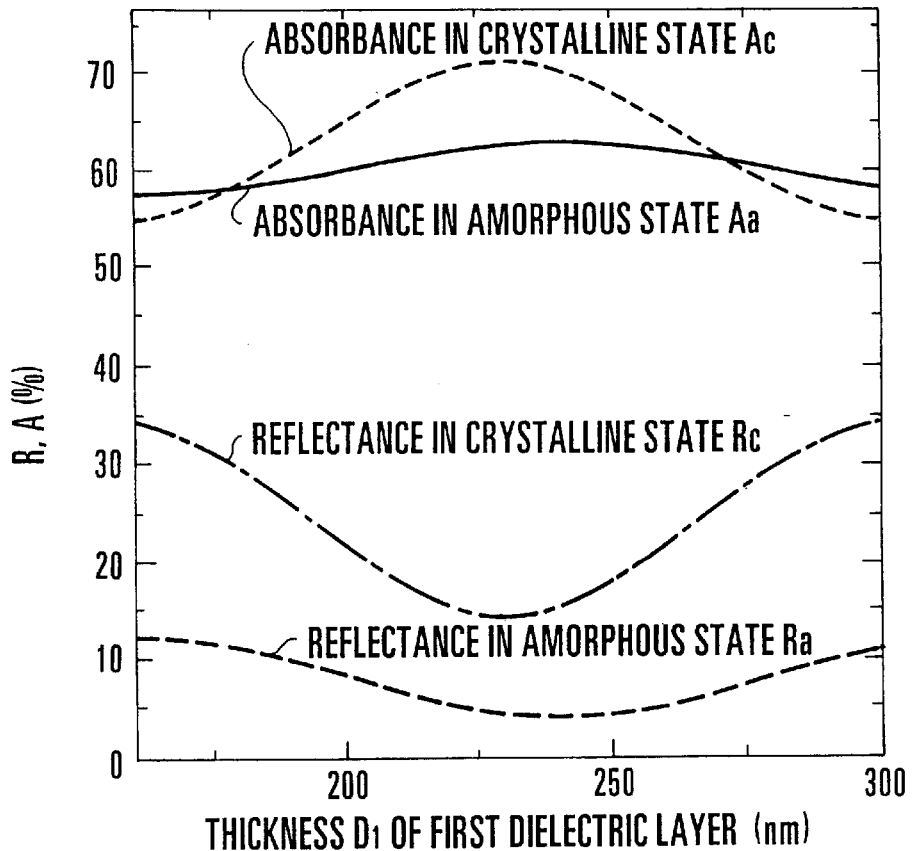
FIG. 3 is a graph showing an optical design of a conventional optical information recording medium.
Figure 4:
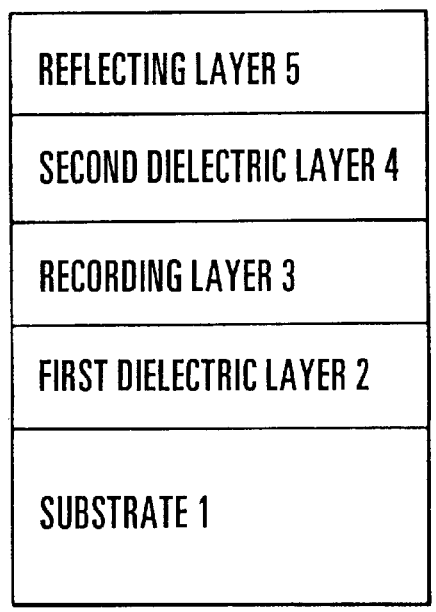
FIG. 4 is a sectional view showing a medium structure of a conventional phase change optical disk.

FIG. 2 shows a cross-section of an optical information recording medium according to the present invention. A first dielectric layer 102, a recording layer 103, a second dielectric layer 104, a reflecting layer 105, a third dielectric layer 106, and an ultraviolet-curing resin layer 107 are sequentially stacked on a substrate 101.

The first and second dielectric layers 102 and 104 sandwich the recording layer 103 to protect it. The recording layer 103 is irradiated with a laser beam to undergo a reversible phase change between the crystalline state and the amorphous state, thereby recording and erasing information. The information recorded on the recording layer 103 is reproduced by detecting a change in optical characteristics accompanying a phase change of the recording layer 103 upon irradiation of a laser beam. The reflecting layer 105 is made of a transparent dielectric material. The thickness of the reflecting layer 105 is set to control the reflectance with respect to light incident from the substrate 101 side. The third dielectric layer 106 is made of a transparent dielectric material. The thickness of the third dielectric layer 106 is set to control Ac/Aa. The ultraviolet-curing resin layer 107 is made of a resin which is cured upon irradiation of ultraviolet rays. The ultraviolet-curing resin layer 107 protects the surface of the optical disk having the above multilayer structure against damage.

EXAMPLE 1

Polycarbonate (PC) was used for the transparent substrate 101. A 250-nm thick ZnS—SiO$_2$ layer as the first dielectric layer 102, a 15-nm thick Ge$_2$Sb$_2$Te$_5$ layer as the recording layer 103, a 18-nm thick ZnS—SiO$_2$ as the second dielectric layer 104, a 60-nm thick Si layer as the reflecting layer 105, and a 100-nm thick ZnS—SiO$_2$ layer as the third dielectric layer 106 were sequentially stacked by sputtering. With this structure, Ac/Aa was 1.22.

Figure 5:
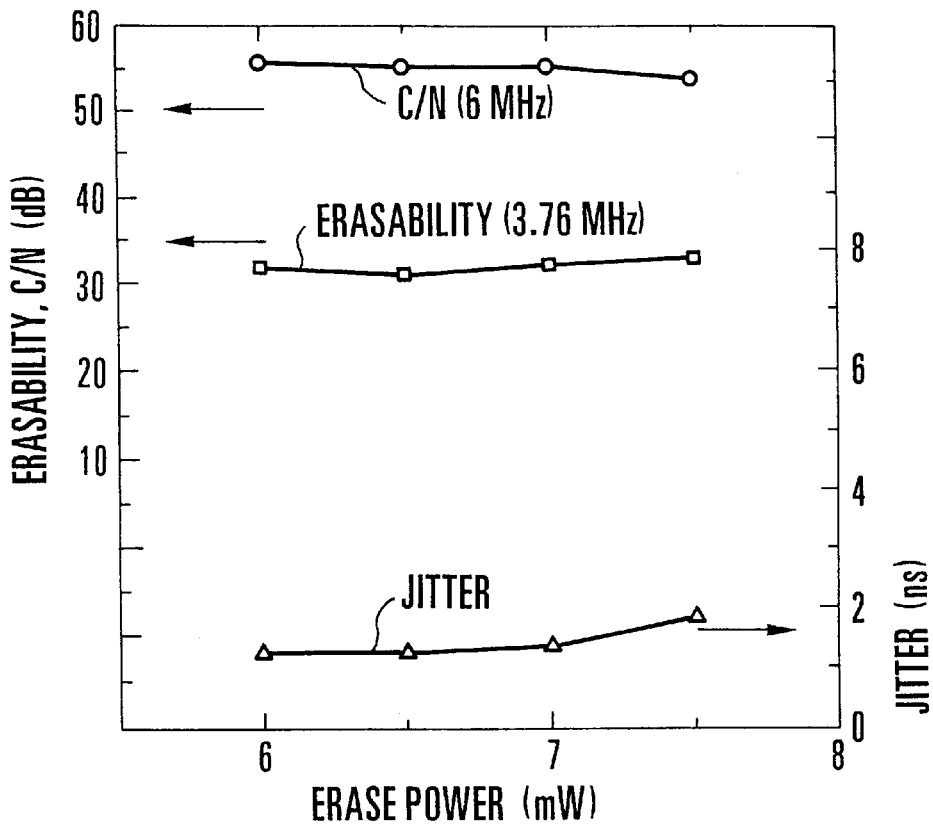
FIG. 5 is a graph showing the overwrite characteristics in Example 1.

The above disk was rotated at a linear velocity of 20 m/s, and information was recorded and erased by using a semiconductor laser with a wavelength of 690 nm. A signal of 6.00 MHz and duty=50% was overwritten on a signal of 3.76 MHz and duty=50%, and the C/N ratio, the erasability, and the jitter were measured. As shown in FIG. 5, the C/N ratio was as high as 57 dB, and the jitter was as small as 1.2 ns even after the overwrite operation.

COMPARATIVE EXAMPLE 1

The overwrite characteristics of a disk having a four-layer structure at a wavelength of 690 nm were measured. The structure of this disk is almost the same as that of the disk of Example 1 except that the third dielectric layer was not stacked. With this structure, Ac/Aa was 1.07.

The overwrite characteristics of the above disk were measured under the same conditions as those in Example 1. The C/N ratio was as high as 57 dB but the jitter was 2.3 ns. It was therefore confirmed that the jitter greatly increased from the jitter in the first recording operation, which was 1 ns.

EXAMPLE 2

The characteristics of a disk having the following structure were measured. Polycarbonate (PC) was used as the substrate 101. A 240-nm thick ZnS—SiO$_2$ layer, a 15-nm thick Ge$_2$Sb$_2$Te$_5$ layer, a 18-nm thick ZnS—SiO$_2$, and a 60-nm thick Si layer were respectively used as the first dielectric layer 102, the recording layer 103, the second dielectric layer 104, and the reflecting layer 105. TiO$_2$ and AlN were used for the third dielectric layer 106. The thickness of the TiO$_2$ layer was set to be 30 nm, 40 nm, 60 nm, 80 nm, and 90 nm. The thickness of the AlN layer was set to be 50 nm, 60 nm, 90 nm, 110 nm, and 130 nm. The relationship between the thickness of the TiO$_2$ layer and the overwrite characteristics was checked, together with the relationship between the thickness of the AlN layer and the overwrite characteristics.

Figure 6:
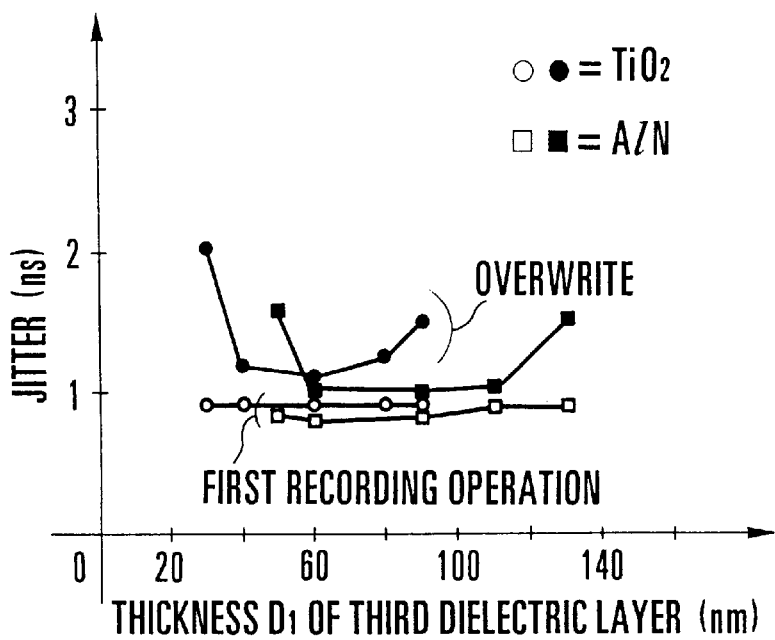
FIG. 6 is a graph showing the correlation between the thickness of a third dielectric layer and the jitter in Example 2.

The above disk was rotated at a constant linear velocity (25 m/s), and information was recorded and erased by using a semiconductor laser with a wavelength of 690 nm. A signal of 6.00 MHz and duty=50% was overwritten on a signal of 3.76 MHz and duty=50%, and the jitter was measured. As shown in FIG. 6, when the TiO$_2$ layer was used as the third dielectric layer 106, an increase in jitter due to an overwrite operation was small in the range of film thicknesses of 40 nm to 80 nm. When the AlN layer was used as the third dielectric layer 106, an increase in jitter was small in the range of film thicknesses of 60 nm to 110 nm. The ranges of the thicknesses of these dielectric layers correspond to $\lambda/6n$ to $\lambda/3n$.

EXAMPLE 3

A disk was formed by using a 10-nm Au layer as the reflecting layer 105, ZnS—SiO$_2$ layers as the first and second dielectric layers 102 and 104, and an AlN layer as the third dielectric layer 106. In this disk, Ac/Aa was 1.2. When the overwrite characteristics of the disk were measured under the same conditions as those in Example 1, a C/N ratio of 56 dB was obtained, and the jitter was as small as 1.3 ns.

EXAMPLE 4

A disk was formed by using a glass substrate having a diameter of 200 mm as the transparent substrate 101, a 240-nm thick ZnS—SiO$_2$ layer as the first dielectric layer 102, a 13-nm thick Ge$_2$Sb$_2$Te$_5$ layer as the recording layer 103, a 18-nm thick ZnS—SiO$_2$ layer as the second dielectric layer 104, a 60-nm thick Si layer as the reflecting layer 105, and a ZnS—SiO$_2$ layer as the third dielectric layer 106. The thickness of the third dielectric layer 106 was 140 nm at an inner peripheral portion (radius 30 mm) of the disk, and 90 nm at the outer peripheral portion (radius 90 mm). With this structure, Ac/Aa was 1.1 at the inner peripheral portion of the disk, and 1.33 at the outer peripheral portion of the disk.

The above disk was rotated at 3,000 r.p.m., and the C/N ratios and the jitters at the inner and outer peripheral portions of the disk in an overwrite operation were measured. At the inner peripheral portion, at which the linear velocity was about 10 m/s, the C/N ratio measured when 3-MHz signal was overwritten on a 1.88-MHz signal was 55 dB, and the jitter was as small as 2 ns. At the outer peripheral portion, at which the linear velocity was 30 m/s, the C/N ratio measured when 9-MHz signal was overwritten on a 5.64-MHz signal was 58 dB, and the jitter was as small as 0.8 ns.

According to the present invention, since Ac/Aa can be increased while a large change in reflectance between the amorphous state and the crystalline state is maintained, an optical information recording medium can be provided, which can attain a high erasability even at a high linear velocity, and exhibits a small increase in jitter due to an overwrite operation. In addition, since the value of Ac/Aa can be changed at the inner and outer peripheral portions of the disk by changing the thickness of the third dielectric layer 106 at the inner and outer peripheral portions of the disk, an overwrite operation can be performed at a constant rotational speed.

Figure 1:
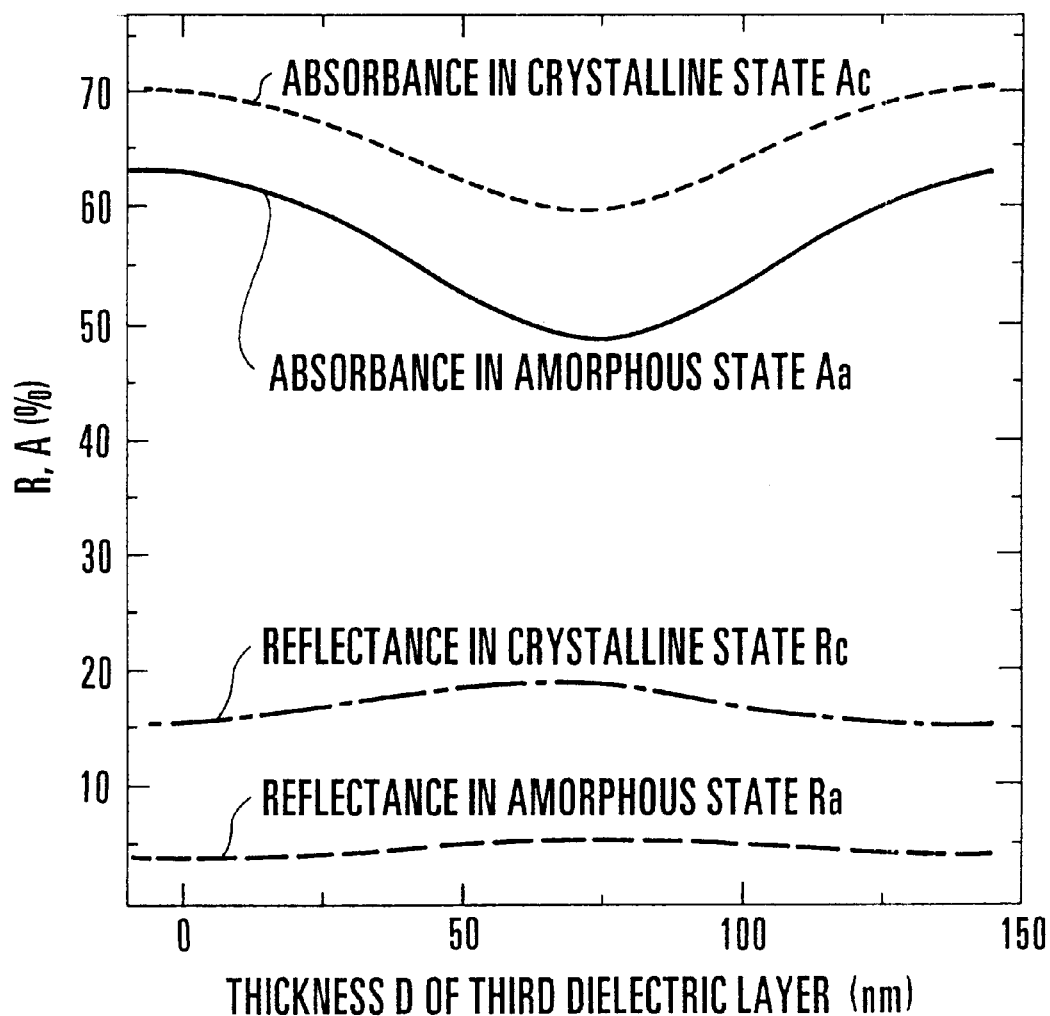
FIG. 1 is a graph showing the optical characteristics of an optical information recording medium according to an embodiment of the present invention.

FIG. 1 shows the optical characteristics of the phase change optical disk, which uses the Si layer as the reflecting layer 105 and includes the third dielectric layer 106, at a wavelength of 690 nm. As is apparent from FIG. 1, the value of Ac/Aa can be changed by changing the thickness of the third dielectric layer 106. This effect, however, can obtained only when a transparent thin metal film or a transparent high-refractive-index material is used for the reflecting layer 105. If a layer like the Al-based metal reflecting layer disclosed in Japanese Patent Laid-Open No. 4-4903 is used, almost no transmitted light is obtained. Even if, therefore, the third dielectric layer 106 is added, the optical characteristics do not change.

In general, the ultraviolet-curing resin layer 107 is formed to protect the surface of the optical disk against damage. Since the refractive index of this resin layer is about 1.5, in order to obtain an optical effect by stacking the third dielectric layer 106, the refractive index of the third dielectric layer 106 must be larger than 1.5. As a material having a refractive index larger than 1.5, ZnS—SiO$_2$ (n=2.1), Al$_2$O$_3$ (n=1.7), AlN (n=2.0), or TiO$_2$ (n=2.8) can be used.

As shown in FIG. 1, by setting a thickness D of the third dielectric layer 106 to be close to $\lambda/4n$ ($\lambda$ is the wavelength of light), Ac/Aa can be set to be as large as about 1.3. When the disk is to be used at a constant high linear velocity as in a case wherein image data is processed, good overwrite characteristics can be obtained by setting the thickness D of the third dielectric layer 106 in the range of $\lambda/6n<D<\lambda/3n$.

The optimal value of Ac/Aa changes depending on the linear velocity. For this reason, when the disk is to be used at a constant rotational speed as in a case wherein document data is processed, the optimal value of Ac/Aa at the inner peripheral portion of the disk is different from that at the outer peripheral portion of the disk. As is apparent from FIG. 1, since the value of Ac/Aa can be changed by changing the thickness of the third dielectric layer 106, the disk can be used at a constant rotational speed by changing the thickness of the third dielectric layer 106 at the inner and outer peripheral portions of the disk. At the outer peripheral portion where a large value of Ac/Aa is required, a thickness Do of the third dielectric layer 106 may be set within the range of $\lambda/6n<Do<\lambda/3n$. At the inner peripheral portion where a relatively small value of Ac/Aa is allowed, a thickness Di of the third dielectric layer 106 may be set within the range of $\lambda/6n>Di$ or $\lambda/3n<Di$.

What is claimed is:

1. A method of making an optical information recording medium, said method comprising the steps of:

selecting a wavelength of light $\lambda$ for irradiation of said medium;

providing a transparent substrate constituting an optical disk;

forming a first dielectric layer on said transparent substrate;

forming a recording layer on said first dielectric layer, said recording layer undergoing a reversible phase change between a crystalline state and an amorphous state when irradiated by a laser beam;

forming a second dielectric layer of uniform thickness on said recording layer;

forming a reflecting layer on said second dielectric layer, said reflecting layer comprising one of a transparent thin metal film and a transparent high-refractive-index material;

selecting a dielectric material having a refractive index n for a third dielectric layer;

selecting a thickness D for said third dielectric layer based on said wavelength of light $\lambda$ and said refractive index n of said dielectric material, wherein said thickness D is selected to satisfy $\lambda/6n<D<\lambda/3n$ so as to control an absorbance Ac of said recording layer in said crystalline state to be always greater than an absorbance Aa of said recording layer in said amorphous state; and forming said third dielectric layer on said reflecting layer according to said selected thickness.

2. The method as set forth in claim 1, wherein said dielectric material for said third dielectric layer is selected from the group consisting of ZnS—SiO$_2$, Al$_2$O$_3$, AlN, and TiO$_2$.

3. The method as set forth in claim 1, further comprising the step of forming a resin layer on said third dielectric layer, said resin layer having a refractive index of 1.5 or less, and adapted to protect a surface of said optical disk from damage.

4. A method of making an optical information recording medium, said method comprising the steps of:

providing a transparent substrate constituting an optical disk;

forming a first dielectric layer on said transparent substrate;

forming a recording layer on said first dielectric layer, said recording layer undergoing a reversible phase change between a crystalline state and an amorphous state when irradiated by a laser beam;

forming a second dielectric layer of uniform thickness on said recording layer;

forming a reflecting layer on said second dielectric layer, said reflecting layer having a reflectance which controls the transmissivity of light incident from said transparent substrate and comprising one of a transparent thin metal film and a transparent high-refractive-index material;

selecting a thickness D for a third dielectric layer wherein said thickness D is selected to satisfy $\lambda/6n < D < \lambda/3n$ so as to control an absorbance Ac of said recording layer in said crystalline state to be always greater than an absorbance Aa of said recording layer in said amorphous state; and forming said third dielectric layer on said reflecting layer according to said selected thickness, said third dielectric layer being made of a dielectric material having a refractive index n greater than 1.5;

wherein said step of forming said reflecting layer is performed so that said reflecting layer does not prevent said control of said Ac/Aa relationship by said third dielectric layer.

* * * * *